(12) United States Patent
Li et al.

(10) Patent No.: US 12,352,350 B2
(45) Date of Patent: Jul. 8, 2025

(54) OIL-WATER DOUBLE-COOLING ELECTRIC DRIVE ASSEMBLY, AND NEW ENERGY AUTOMOBILE

(71) Applicant: Jing-Jin Electric Technologies Co., Ltd., Beijing (CN)

(72) Inventors: Jianwen Li, Beijing (CN); Ping Yu, Beijing (CN); Xudong Yang, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 530 days.

(21) Appl. No.: 17/635,757

(22) PCT Filed: Oct. 29, 2019

(86) PCT No.: PCT/CN2019/114069
§ 371 (c)(1),
(2) Date: Feb. 16, 2022

(87) PCT Pub. No.: WO2021/042465
PCT Pub. Date: Mar. 11, 2021

(65) Prior Publication Data
US 2022/0316581 A1  Oct. 6, 2022

(30) Foreign Application Priority Data
Sep. 3, 2019  (CN) .......................... 201910828481.8

(51) Int. Cl.
*F16H 57/04* (2010.01)
*B60K 1/00* (2006.01)
(Continued)

(52) U.S. Cl.
CPC .......... *F16H 57/0476* (2013.01); *B60K 1/00* (2013.01); *B60K 11/02* (2013.01); *F16H 57/02* (2013.01);
(Continued)

(58) Field of Classification Search
CPC .... B60K 11/02; B60K 2001/006; B60K 1/00; B60K 17/04; B60K 11/04; F16H 57/0415;
(Continued)

(56) References Cited

U.S. PATENT DOCUMENTS 10,272,767 B1   4/2019  Tang et al.
2016/0164377 A1  6/2016  Gauthier et al.
2018/0054094 A1  2/2018  Dlala et al.

FOREIGN PATENT DOCUMENTS

CN   207896812 U    9/2018
CN   208118917 U    11/2018
(Continued)

OTHER PUBLICATIONS

CN109130839A English translation (Year: 2024).*
(Continued)

*Primary Examiner* — Christopher M Koehler
*Assistant Examiner* — Viswanathan Subramanian
(74) *Attorney, Agent, or Firm* — ARENTFOX SCHIFF LLP

(57) ABSTRACT

An electric drive assembly with oil/water dual cooling is provided that includes a motor module, a gearbox module, a water cooling module and an oil cooling module. Lubricating oil is introduced into the front and rear windings of the motor through three oil conveying passages to improve the cooling performance of the motor. Moreover, the gearbox cavity and the motor cavity do not need to be sealed, which avoids the use of high-speed oil seal of motor shaft, (Continued)

and thus the cost of the drive assembly is reduced and the transmission efficiency is improved. The cooling fluid of the motor cools the lubricating oil through the heat exchanger of the gearbox, thereby solving the heat dissipation problem when the gearbox of the new energy vehicle operates at high speed constantly, and thus improving the service life and reliability of the gear and bearing.

13 Claims, 2 Drawing Sheets

(51) Int. Cl.
- B60K 11/02 (2006.01)
- F16H 57/02 (2012.01)
- H02K 5/20 (2006.01)
- H02K 7/116 (2006.01)
- H02K 9/19 (2006.01)

(52) U.S. Cl.
CPC ..... *F16H 57/0402* (2013.01); *F16H 57/0415* (2013.01); *F16H 57/0421* (2013.01); *F16H 57/043* (2013.01); *F16H 57/045* (2013.01); *F16H 57/0457* (2013.01); *H02K 5/203* (2021.01); *H02K 7/116* (2013.01); *H02K 9/19* (2013.01); *B60K 2001/006* (2013.01); *F16H 2057/02034* (2013.01); *F16H 57/046* (2013.01)

(58) Field of Classification Search
CPC .. F16H 57/0476; F16H 57/02; F16H 57/0402; F16H 57/0421; F16H 57/043; F16H 57/045; F16H 57/0457; F16H 57/046; F16H 2057/02034; H02K 5/203; H02K 7/116; H02K 9/19; H02K 7/083; H02K 3/24; H02K 9/193; B60Y 2306/03; B60Y 2306/05; B60Y 2410/10; B60Y 2410/102

USPC .............................................. 310/64, 58, 54
See application file for complete search history.

(56) References Cited

FOREIGN PATENT DOCUMENTS

| CN | 109038951 A | | 12/2018 | |
|---|---|---|---|---|
| CN | 109130839 A | * | 1/2019 | ............... B60B 1/06 |
| CN | 109538743 A | | 3/2019 | |
| CN | 110065374 A | | 7/2019 | |
| CN | 2020-07-31 U | | 7/2020 | |
| JP | 2008-64040 A | | 3/2008 | |
| JP | 2011213290 A | | 10/2011 | |
| JP | 2014220960 A | | 11/2014 | |
| JP | 2019134614 A | | 8/2019 | |
| JP | 2022508386 A | | 1/2022 | |
| KR | 20050013761 A | | 2/2005 | |
| WO | 2019091351 A1 | | 5/2019 | |

OTHER PUBLICATIONS

CN109538743A English translation (Year: 2024).*
WO2019091351A1 English translation (Year: 2024).*
Chinese Office Action mailed Feb. 23, 2023, in CN201910828481.8 (12 pages).
Japanese Office Action mailed Mar. 28, 2023, in JP2022-513651 (4 pages).
Decision to Grant mailed Sep. 5, 2023, in JP2022-513651 (5 pages).
Supplementary European Search Report mailed Sep. 13, 2022 issued in corresponding European Patent Application No. 19944108.
International Search Report and Written Opinion mailed Jun. 10, 2020 issued in PCT Appliation No. PCT/CN2019/114069.

* cited by examiner

OIL-WATER DOUBLE-COOLING ELECTRIC DRIVE ASSEMBLY, AND NEW ENERGY AUTOMOBILE

CROSS-REFERENCE TO RELATED APPLICATIONS

This application is a National Phase of PCT/CN2019/114069, filed on Oct. 29, 2019, which claims priority to Chinese Patent Application No. 201910828481.8, filed on Sep. 3, 2019, the disclosures of each of which are hereby incorporated by reference in their entireties.

TECHNICAL FIELD

The present disclosure relates to the field of drive assembly manufacturing, in particular to an electric drive assembly with oil/water dual cooling and a new energy vehicle.

BACKGROUND

As the problems such as oil shortage, air pollution and national energy security become getting worse, the new energy vehicle industry is developing rapidly. As one of the core parts of new energy vehicles, the motor gearbox drive assembly has an important impact on the layout of new energy vehicle industry. The motor gearbox drive assembly of new energy vehicle has the characteristics of high rotation speed and high power density, and has high requirements for reliability, cooling and lubrication. At present, the cooling of motor mainly depends on the circulating cooling fluid in the water jacket to cool the stator, while the cooling of windings depends on natural heat dissipation and without being directly cooled, so the motor cannot run for a long time at maximum power. At present, the cooling of the gearbox depends on air cooling, and the cooling effect is poor. Especially in the high rotation speed range, the temperature rises very fast, which tend to cause the early failure of internal parts.

At the same time, the end customers' requirements for the mileage and performance of the whole vehicle become increasingly higher, and the electric drive system is required to have good power performance and smoothness. When the torque density is improved, it is urgent to design a set of efficient cooling system to meet the development needs of the market.

SUMMARY

In view of the above problems, the present disclosure is proposed to provide an electric drive assembly with oil/water dual cooling and a new energy vehicle that solve or at least partially solve the above technical problems.

In order to achieve the above object, the present disclosure adopts the following technical solutions.

An aspect of the present disclosure provides an electric drive assembly with oil/water dual cooling, wherein
  the electric drive assembly comprises a motor module, a gearbox module, a water cooling module and an oil cooling module;
  the motor module comprises a motor housing, a motor shaft and a stator;
  the gearbox module comprises a gearbox housing, and the gearbox housing is connected with a rear end of the motor housing;
  the water cooling module comprises a motor water jacket and a heat exchanger, the motor water jacket is integrally cast with the motor housing, the motor water jacket is provided with a first water inlet and a first water outlet, the heat exchanger is disposed at a lower end of the gearbox housing, and the heat exchanger is provided with a second water inlet and a second water outlet;
  the oil cooling module comprises an oil conveying device, an oil conveying passage and an oil return passage, the oil conveying device is disposed at a bottom of the gearbox housing, the oil conveying passage is communicated with an inside of the motor housing and an inside of the gearbox housing, and the oil return passage is disposed at a bottom of the motor housing.

Optionally, the oil conveying device is one or more gears, and/or the oil conveying device is one or more nozzles.

Optionally, the oil conveying passage comprises a first oil conveying passage, and the first oil conveying passage comprises a first oil storage tank, a first oil inlet, a first oil passage and a first oil outlet; the first oil inlet is disposed on an upper part of a front end face of the gearbox housing above the motor housing, the first oil storage tank is disposed below the first oil inlet, the first oil passage is an oil pipe or is cast integrally with the motor water jacket, the first oil passage is provided with a first oil outlet at a front end of an upper part of the motor housing, and the first oil outlet is positioned facing a front winding of the stator.

Optionally, the oil conveying passage comprises a second oil conveying passage, and the second oil conveying passage comprises a second oil storage tank, a second oil inlet, a second oil passage and a second oil outlet; the second oil inlet is disposed at a position on the front end face of the gearbox housing above the motor housing that is close to the motor housing, the second oil storage tank is disposed below the second oil inlet, the second oil passage is an oil pipe or is formed by casting at an intersection of a front end of the gearbox housing and an upper part of the motor housing, the second oil outlet is disposed at a rear end of the upper part of the motor housing, and the second oil outlet is positioned facing a rear winding of the motor stator.

Optionally, the oil conveying passage comprises a third oil conveying passage, and the third oil conveying passage is an oil passage formed by a rear end bearing of the motor shaft.

Optionally, a strong magnetic body is provided at any one or more among an oil inlet of the oil conveying passage, the bottom of the gearbox housing and a front side of a rear end bearing of the motor shaft respectively.

Optionally, the water cooling assembly further comprises a water pipe, and the first water outlet and the second water inlet are communicated through the water pipe.

Optionally, a second water passage and a third water passage are further formed by casting in a housing between the motor water jacket and the heat exchanger, the second water passage is hermetically connected or integrally formed with the second water inlet, and the third water passage is hermetically connected or integrally formed with the second water outlet.

Optionally, the heat exchanger and the gearbox housing are integrally cast, or the heat exchanger is installed at the bottom of the gearbox housing.

Another aspect of the present disclosure provides a new energy vehicle comprising any one of the electric drive assemblies with oil/water dual cooling as stated above.

The motor gearbox drive assembly using the above oil cooling system and water cooling system has the following advantages:

The electric drive assembly of the present disclosure eliminates the need for the high-speed oil seal on the motor shaft, reduces the number of parts, reduces the cost, avoids the friction loss of the oil seal and improves the efficiency of the assembly.

The oil cooling module in the present disclosure introduces the lubricating oil in the gearbox to the front and rear windings of the motor through multiple passages, so that the temperature of motor windings is reduced and they can run for a long time under the maximum power.

The water cooling module in the present disclosure introduces the motor stator cooling fluid into the heat sink of the gearbox to cool the lubricating oil of the gearbox, so as to ensure that the gearbox has good heat dissipation performance under a high speed.

The above is only an overview of the technical solutions of the present disclosure. In order to better understand the technical means of the present disclosure so that it can be implemented according to the contents of the description, and in order to make the above and other objects, features and advantages of the present disclosure more obvious and easy to understand, the specific embodiments of the present disclosure are given below.

BRIEF DESCRIPTION OF DRAWINGS

By reading the detailed description of the preferred embodiments below, various other advantages and benefits will become clear to a person of ordinary skill in the art. The drawings are only used for the purpose of illustrating the preferred embodiments, and should not be considered as a limitation to the present disclosure. Moreover, throughout the drawings, like reference numerals denote like components. In the drawings.

Figure 1:
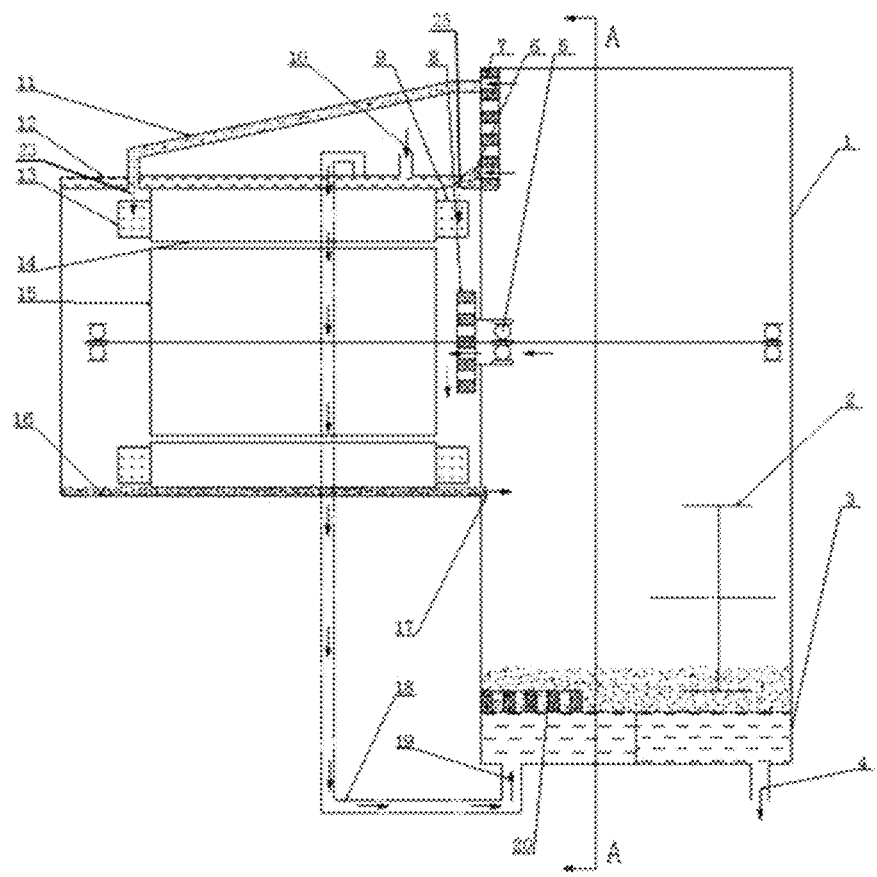
FIG. 1 is a schematic view of the structure of an oil/water dual cooling electric drive assembly in an embodiment of the present disclosure.

In the drawings: 1. gearbox housing, 2. oil conveying device, 3. heat exchanger, 4. second water outlet, 5. intermediate bearing, 6. second oil passage, 7. strong magnetic body, 8. strong magnetic body, 9. rear winding, 10. first water inlet, 11. first oil passage, 12. motor water jacket, 13. front winding, 14. stator, 15. rotor, 16. oil return passage, 17. oil return passage port, 18. water pipe, 19. second water inlet, 20. strong magnetic body, 21. first oil storage tank, 22. second oil storage tank, 23. first oil outlet, 24. first oil inlet, 25. second oil outlet, 26. second oil inlet.

DETAILED DESCRIPTION

Illustrative embodiments of the present disclosure will be described in more detail with reference to the drawings. Although the drawings show the illustrative embodiments of the present disclosure, it should be understood that the present disclosure can be implemented in various ways and should not be limited by the embodiments disclosed herein. On the contrary, the embodiments are provided for a more thorough and complete understanding of the present disclosure, so as to fully convey the scope of the present disclosure to those skilled in the art.

In order to more clearly describe the technical solutions of the present disclosure, it is specially specified that in FIG. 1, the left side is the front end or front side, and the right side is the rear end or rear side.

First Embodiment

Figure 2:
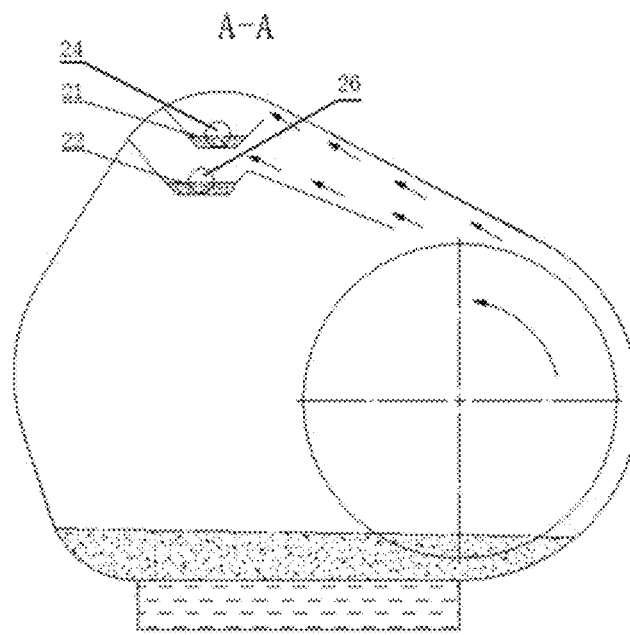
FIG. 2 is a sectional view along line A-A in FIG. 1.
Figure 3:
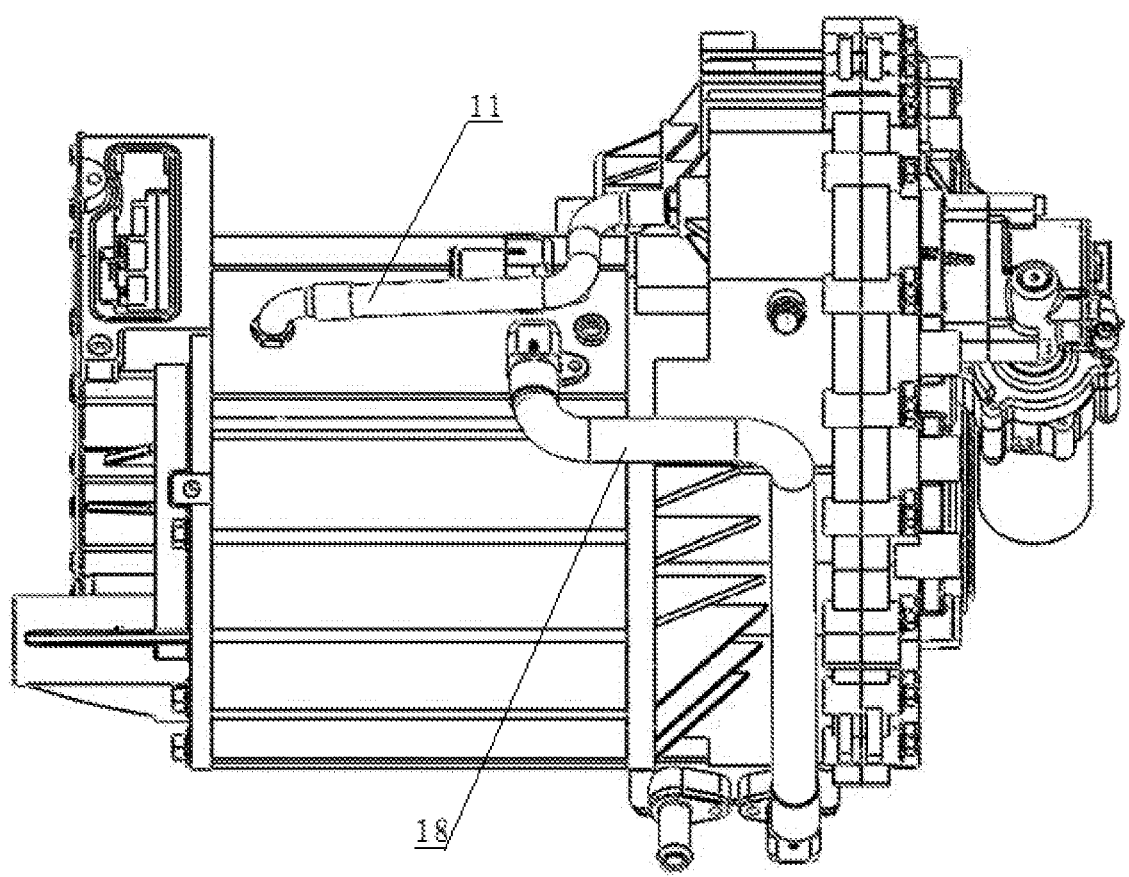
FIG. 3 is a perspective view of an electric drive assembly with oil/water dual cooling in an embodiment of the present disclosure.

As shown in FIGS. 1, 2 and 3, the first embodiment of the present disclosure discloses an electric drive assembly with oil/water dual cooling comprising a motor module, a gearbox module, a water cooling module and an oil cooling module. The motor module comprises a motor housing, a motor shaft and a stator 14, and the stator 14 is provided with windings. The gearbox module comprises a gearbox housing 1, and the gearbox housing 1 is disposed at the rear end of the motor housing. The connection structure of the gearbox housing 1 and the motor housing is shown in FIG. 1 and FIG. 3.

The water cooling module in the present embodiment of the present disclosure mainly comprises a motor water jacket 12 and a heat exchanger 3. The motor water jacket and the heat exchanger may be connected together, or may be connected in series respectively. The motor water jacket 12 may be integrally cast with the motor housing. Of course, it may also be sleeved on the motor housing by assembly. The motor water jacket 12 is provided with a first water inlet 10 and a first water outlet. The heat exchanger 3 is disposed at the lower end of the gearbox housing 1. The heat exchanger 3 is provided with a second water inlet 19 and a second water outlet 4. The motor water jacket 12 may be connected with the heat exchanger 3. For example, the cooling fluid in the motor water jacket 12 is introduced into the heat exchanger 3 through a pipe or a passage provided in the gearbox housing 1. After circulation, the cooling fluid flows back to the vehicle reservoir through the second water outlet 4. Of course, the motor water jacket 12 and the heat exchanger 3 may also be connected to the vehicle reservoir through pipes respectively.

The oil cooling module in the present embodiment of the present disclosure comprises an oil conveying device 2, an oil conveying passage and an oil return passage 16. The oil conveying device is disposed at the bottom of the gearbox housing 1, the oil conveying passage is communicated with the inside of the motor housing and the inside of the gearbox housing 1, and the oil return passage 16 is disposed at the bottom of the motor housing. The oil conveying device 2 can lift, splash or spray the lubricating oil from the bottom of the gearbox housing 1, for example, it can send the lubricating oil to the first oil storage tank 21 and the second oil storage tank 22. The first oil storage tank 21 and the second oil storage tank 22 are respectively communicated with the first oil passage 11 and the second oil passage 6. The lubricating oil in the oil storage tank is sent into the motor housing through the oil passages, so as to realize oil cooling and lubrication of the motor. The oil return passage 16 can return the lubricating oil into the gearbox housing 1, thereby realizing one circulation of lubricating oil.

Further, in an embodiment, the oil conveying device 2 is one or more gears, and/or the oil conveying device is one or more nozzles. The oil conveying device 2 may be one gear or a set of gears, and the rotation of the gear can splash the lubricating oil to realize oil conveying. The oil conveying device 2 may also be a nozzle, which can be used to spray oil into the oil passage or the oil storage tank. Of course, the oil conveying device may also be other devices that drive oil to move.

In a preferred embodiment, the oil conveying passage comprises a first oil conveying passage. The first oil conveying passage comprises a first oil storage tank 21, a first oil inlet 24, a first oil passage 11 and a first oil outlet 23. The first oil inlet 24 is disposed at the upper part of the front end face of the gearbox housing 1 above the motor housing. The first oil storage tank 21 is disposed below the first oil inlet 24. The first oil passage 11 is an oil pipe, or is cast integrally with the motor water jacket. The first oil passage 11 is provided with a first oil outlet 23 at the front end of the upper part of the motor housing, and preferably, the first oil outlet 23 is positioned facing the front winding 13 of the stator 14.

Preferably, the first oil storage tank 21 is disposed on the inner wall of the front end face of the gearbox housing 1. The front end of the first oil storage tank 21 is connected to the first oil inlet 24. The first oil storage tank 21 may extend to the rear end face of the gearbox housing 1 through the side wall of the gearbox housing, so as to increase the oil receiving area. Of course, it may not extend to the rear end face of the gearbox housing 1. The first oil storage tank 21 may be an integral structure with the gearbox housing 1, or may be a container such as a semicircular tube installed on the gearbox housing 1. The lubricating oil in the oil storage tank enters the first oil passage 11 through the first oil inlet 24. The lubricating oil in the first oil passage 11 flows out of the first oil outlet 23 due to gravity. The first oil outlet 23 is facing the front winding 13 to realize the cooling of the front winding 13 by the lubricating oil.

In the present embodiment, the first oil passage 11 may be a built-in passage formed on the motor housing by casting, or an external oil pipe. The oil pipe connection avoids the complicated oil passage structure on the housing, reduces the casting difficulty of the housing, and is convenient for layout on the whole vehicle.

In an embodiment, the oil conveying passage comprises a second oil conveying passage. The second oil conveying passage comprises a second oil storage tank 22, a second oil inlet 26, a second oil passage 6 and a second oil outlet 25. The second oil inlet 26 is disposed at the lower part of the front end face of the gearbox housing 1 above the motor housing. Preferably, a second oil storage tank 22 is further provided. The second oil storage tank 22 is disposed below the second oil inlet 26. The second oil passage 6 is an oil pipe, or is formed by casting at the intersection of the front end of the gearbox housing and the rear end of the upper part of the motor housing. The second oil outlet 25 is disposed at the rear end of the upper part of the motor housing, and preferably, the second oil outlet 25 is positioned facing the rear winding 9 of the motor stator 14.

In the present embodiment, the second oil inlet 26 is disposed below the first oil storage tank 21 and communicated with the second oil storage tank 22. The second oil storage tank 22 is disposed in parallel with the first oil storage tank 21, and the lubricating oil in the second oil storage tank 22 flows into the second oil passage from the second oil inlet 26. Of course, in some cases, the second oil storage tank may not be provided. Finally, the lubricating oil flows out of the second oil outlet 25 due to gravity and flows onto the rear winding 9, so as to cool the rear winding 9 of the motor stator.

In the present embodiment, based on the same principle, the second oil passage 6 may be a built-in passage formed on the motor housing by casting, or an external oil pipe. The oil pipe connection avoids the complicated oil passage structure on the housing, reduces the casting difficulty of the housing, and is convenient for layout on the whole vehicle.

In an embodiment, the oil conveying passage comprises a third oil conveying passage, and the third oil conveying passage is an oil passage formed by a rear end bearing 5 of the motor shaft. The third oil conveying passage is the passage for cooling and lubricating the rear end bearing of the motor shaft and the rear winding 9 of the stator.

Preferably, a strong magnetic body is provided at any one or more among an oil inlet of the oil conveying passage, the bottom of the gearbox housing 1 and the front side of the rear end bearing 5 of the motor shaft respectively. The purpose of providing the strong magnetic bodies is to adsorb the iron filings in the lubricating oil, so as to purify the lubricating oil and reduce the damage to the bearing.

In an embodiment, the water cooling module further comprises a water pipe 18. The water pipe 18 is communicated with the first water outlet and the second water inlet 19. The motor water jacket and heat exchanger 3 are connected in series through the water pipe 18.

In an embodiment, a second water passage and a third water passage are further formed by casting in the housing between the motor water jacket and the heat exchanger 3. The second water passage is hermetically connected or integrally formed with the second water inlet 19, and the third water passage is hermetically connected or integrally formed with the second water outlet 4. The cooling fluid in the motor water jacket flows into the heat exchanger 3 through the second water passage. After cooling the lubricating oil at the bottom of the gearbox housing 1, the cooling fluid flows back to the motor water jacket through the third water passage. Finally, the cooling fluid flows to the vehicle reservoir through the water outlet at the upper part of the motor water jacket, thereby realizing one circulation of cooling fluid.

In an embodiment, the heat exchanger 3 and the gearbox housing 1 may be cast integrally. Alternatively, the heat exchanger 3 may be regarded as a separate part and installed at the bottom of the gearbox housing 1.

To sum up, the present disclosure discloses an electric drive assembly with oil/water dual cooling. The electric drive assembly comprises a motor module, a gearbox module, a water cooling module and an oil cooling module. The motor module comprises a motor housing, a motor shaft and a stator. The gearbox module comprises a gearbox housing, and the gearbox housing is connected with a rear end of the motor housing. The water cooling module comprises a motor water jacket and a heat exchanger, the motor water jacket is integrally cast with the motor housing, the motor water jacket is provided with a first water inlet and a first water outlet, the heat exchanger is disposed at a lower end of the gearbox housing, and the heat exchanger is provided with a second water inlet and a second water outlet. The oil cooling module comprises an oil conveying device, an oil conveying passage and an oil return passage, the oil conveying device is disposed at a bottom of the gearbox housing, the oil conveying passage is communicated with an inside of the motor housing and an inside of the gearbox housing, and the oil return passage is disposed at a bottom of the motor housing. In this technical solution, the lubricating oil is introduced onto the front and rear windings of the motor through three oil conveying passages, the cooling performance of the motor is improved; moreover, the gearbox cavity and the motor cavity do not need to be sealed, which avoids the use of high-speed oil seal of motor shaft, and thus the cost of the drive assembly is reduced and the transmission efficiency is improved. The cooling fluid of the motor cools the lubricating oil through the heat exchanger of the gearbox, thereby solving the heat dissipation problem when the gearbox of the new energy vehicle operates under a high speed constantly, and thus improving the service life and reliability of the gear and bearing.

Second Embodiment

The present embodiment of the present disclosure also discloses a new energy vehicle comprising any one of the electric drive assemblies with oil/water dual cooling as stated above.

The above are only the specific embodiments of the present disclosure, but the protection scope of the present disclosure is not limited to this. Any person skilled in the art can easily think of changes or substitutions within the technical scope disclosed by the present disclosure, which should be covered by the protection scope of the present disclosure. Therefore, the protection scope of the present disclosure shall be subject to the protection scope of the claims.

What is claimed is:

1. An electric drive assembly with oil/water dual cooling, the electric drive assembly comprising:
   a motor module having a motor housing, a motor shaft and a stator;
   a gearbox module having a gearbox housing, and the gearbox housing is connected with a rear end of the motor housing;
   a water cooling module having a motor water jacket and a heat exchanger, the motor water jacket is integrally cast with the motor housing, the motor water jacket is provided with a first water inlet and a first water outlet, the heat exchanger is disposed at a lower end of the gearbox housing, and the heat exchanger is provided with a second water inlet and a second water outlet; and
   an oil cooling module having an oil conveying device, an oil conveying passage and an oil return passage, the oil conveying device is disposed at a bottom of the gearbox housing, the oil conveying passage is communicated with an inside of the motor housing and an inside of the gearbox housing, and the oil return passage is disposed at a bottom of the motor housing,
   wherein the oil conveying passage comprises a first oil conveying passage, and the first oil conveying passage comprises a first oil storage tank, a first oil inlet, a first oil passage and a first oil outlet, and
   wherein the first oil inlet is disposed on an upper part of a front end face of the gearbox housing above the motor housing, the first oil storage tank is disposed below the first oil inlet, the first oil passage is provided with the first oil outlet at a front end of an upper part of the motor housing, and the first oil outlet is positioned facing a front winding of the stator, the first oil passage is cast integrally with the motor water jacket,
   wherein the water cooling assembly further comprises a water pipe as a first water passage, and the first water outlet and the second water inlet are communicated through the water pipe,
   wherein a second water passage and a third water passage are further formed by casting in a housing between the motor water jacket and the heat exchanger, the second water passage is hermetically connected or integrally formed with the second water inlet, and the third water passage is hermetically connected or integrally formed with the second water outlet,
   wherein the cooling fluid in the motor water jacket flows into the heat exchanger through the second water passage, after cooling the lubricating oil at the bottom of the gearbox housing, the cooling fluid flows back to the motor water jacket through the third water passage.

2. The electric drive assembly according to claim 1, wherein the oil conveying device is at least one of one or more gears and one or more nozzles.

3. The electric drive assembly according to claim 1, wherein the oil conveying passage comprises a second oil conveying passage, and the second oil conveying passage comprises a second oil storage tank, a second oil inlet, a second oil passage and a second oil outlet;
   the second oil inlet is disposed at a position on a front end face of the gearbox housing above the motor housing that is close to the motor housing, the second oil storage tank is disposed below the second oil inlet, the second oil passage is an oil pipe, or is formed by casting at an intersection of a front end of the gearbox housing and an upper part of the motor housing, the second oil outlet is disposed at a rear end of the upper part of the motor housing, and the second oil outlet is positioned facing a rear winding of the motor stator.

4. The electric drive assembly according to claim 1, wherein the oil conveying passage comprises a third oil conveying passage, and the third oil conveying passage is an oil passage formed by a rear end bearing of the motor shaft.

5. The electric drive assembly according to claim 1, wherein a strong magnetic body is provided at any one or more among an oil inlet of the oil conveying passage, the bottom of the gearbox housing and a front side of a rear end bearing of the motor shaft respectively.

6. The electric drive assembly according to claim 1, wherein the heat exchanger and the gearbox housing are integrally cast, or the heat exchanger is installed at the bottom of the gearbox housing.

7. A new energy vehicle, comprising an electric drive assembly with oil/water dual cooling according to claim 1.

8. The new energy vehicle according to claim 7, wherein the oil conveying device is at least one of one or more gears and one or more nozzles.

9. The new energy vehicle according to claim 7,
   wherein the oil conveying passage comprises a first oil conveying passage, and the first oil conveying passage comprises a first oil storage tank, a first oil inlet, a first oil passage and a first oil outlet, and
   wherein the first oil inlet is disposed on an upper part of a front end face of the gearbox housing above the motor housing, the first oil storage tank is disposed below the first oil inlet, the first oil passage is an oil pipe or is cast integrally with the motor water jacket, the first oil passage is provided with the first oil outlet at a front end of an upper part of the motor housing, and the first oil outlet is positioned facing a front winding of the stator.

10. The new energy vehicle according to claim 7,
    wherein the oil conveying passage comprises a second oil conveying passage, and the second oil conveying passage comprises a second oil storage tank, a second oil inlet, a second oil passage and a second oil outlet, and
    wherein the second oil inlet is disposed at a position on a front end face of the gearbox housing above the motor housing that is close to the motor housing, the second oil storage tank is disposed below the second oil inlet, the second oil passage is an oil pipe, or is formed by casting at an intersection of a front end of the gearbox housing and an upper part of the motor housing, the second oil outlet is disposed at a rear end of the upper part of the motor housing, and the second oil outlet is positioned facing a rear winding of the motor stator.

11. The new energy vehicle according to claim 7, wherein the oil conveying passage comprises a third oil conveying passage, and the third oil conveying passage is an oil passage formed by a rear end bearing of the motor shaft.

12. The new energy vehicle according to claim 7, wherein a strong magnetic body is provided at any one or more among an oil inlet of the oil conveying passage, the bottom of the gearbox housing and a front side of a rear end bearing of the motor shaft respectively.

13. The new energy vehicle according to claim 7, wherein the heat exchanger and the gearbox housing are integrally cast, or the heat exchanger is installed at the bottom of the gearbox housing.

* * * * *